United States Patent
Witzel et al.

(10) Patent No.: US 9,370,276 B2
(45) Date of Patent: Jun. 21, 2016

(54) PORTABLE STOVE WITH REMOVABLE ADJUSTABLE LEGS

(71) Applicant: Onward Multi-Corp Inc., Waterloo (CA)

(72) Inventors: Theodore Andrew Witzel, Kitchener (CA); James Edward Scott, Cambridge (CA); Benjamin Michael Harrison, Waterloo (CA)

(73) Assignee: Onward Multi-Corp. Inc., Waterloo, Ontario (CA)

( * ) Notice: Subject to any disclaimer, the term of this patent is extended or adjusted under 35 U.S.C. 154(b) by 438 days.

(21) Appl. No.: 13/833,558

(22) Filed: Mar. 15, 2013

(65) Prior Publication Data

US 2014/0261393 A1    Sep. 18, 2014

(51) Int. Cl.
*F24C 3/14* (2006.01)
*A47J 37/07* (2006.01)
*A47J 36/34* (2006.01)
*F24C 1/16* (2006.01)

(52) U.S. Cl.
CPC .............. *A47J 37/0713* (2013.01); *A47J 36/34* (2013.01); *A47J 37/0763* (2013.01); *F24C 1/16* (2013.01); *F24C 3/14* (2013.01); *A47J 2037/0777* (2013.01)

(58) Field of Classification Search
CPC ..... F24C 3/14; A47J 37/0763; A47J 37/0713; A47J 2037/0777; A47J 33/00; A47J 36/36; A47J 37/042; A47J 36/26; A47J 37/067; A47J 37/0682; A47J 36/34; A47B 2013/022; F16B 12/32; F16B 12/38; F24B 1/20; F24B 1/205; F24B 1/202; F24B 1/207; F24B 1/22; F24B 1/24

See application file for complete search history.

(56) References Cited

U.S. PATENT DOCUMENTS

| | | |
|---|---|---|
| D295,818 S | 5/1988 | Chan |
| 5,906,196 A | 5/1999 | Measom |
| D451,751 S | 12/2001 | Stewart et al. |
| D456,202 S | 4/2002 | McNair et al. |
| D460,312 S | 7/2002 | Fry et al. |
| D460,658 S | 7/2002 | Wu |
| D465,691 S | 11/2002 | Wu |
| 6,725,856 B1 * | 4/2004 | Barbour et al. ............... 126/50 |
| D489,221 S | 5/2004 | Pai |
| 6,792,935 B2 | 9/2004 | Williams et al. |
| D512,871 S | 12/2005 | Chung |
| D517,365 S | 3/2006 | Huang |
| D521,307 S | 5/2006 | Parrant et al. |
| D562,619 S | 2/2008 | Henley et al. |
| D572,519 S | 7/2008 | Thomas |
| D583,613 S | 12/2008 | Proffitt et al. |
| D636,628 S | 4/2011 | Chung |
| D653,494 S | 2/2012 | Chung |
| D679,937 S | 4/2013 | Chung |
| D680,364 S | 4/2013 | Chung |

(Continued)

OTHER PUBLICATIONS

Windproof Stove—Zippo Outdoor [online]. Published as early as Jul. 31, 2012 Retrieved from the Internet: <URL http://zippooutdoor.com/windproof-camp-stove/.

*Primary Examiner* — Alfred Basichas
(74) *Attorney, Agent, or Firm* — Bereskin & Parr LLP (57) ABSTRACT

A stove comprising a stove body defining an interior cooking chamber, and a plurality of removable leg assemblies for supporting the stove body. Each leg assembly includes a removable leg, and a coupling member for coupling the removable leg to the stove body. The coupling member is configured to provide an adjustable length.

17 Claims, 6 Drawing Sheets

(56) References Cited

U.S. PATENT DOCUMENTS

| | | |
|---|---|---|
| D680,793 S | 4/2013 | Chung |
| D680,794 S | 4/2013 | Chung |
| D681,389 S | 5/2013 | Goecke et al. |
| D689,322 S | 9/2013 | Chung |
| 2002/0020405 A1 | 2/2002 | Coleman et al. |
| 2005/0087182 A1 | 4/2005 | Schulte |
| 2010/0242942 A1 | 9/2010 | Chang |

\* cited by examiner

PORTABLE STOVE WITH REMOVABLE ADJUSTABLE LEGS

TECHNICAL FIELD

The embodiments disclosed herein relate to portable stoves such as gas camp stoves, and, in particular to portable stoves having removable legs for supporting the stove.

BACKGROUND

Portable stoves are frequently used to cook food while camping or otherwise spending time outdoors. A common type of portable stove is a gas camp stove. When cooking food, these camp stoves are often placed on a picnic table or another elevated support surface. However, at many camp sites, there may be no picnic table at all, or the table may be significantly damaged or worn out. The lack of a suitable elevated support surface can make it uncomfortable or difficult to cook food using the stove.

Some portable stoves have legs for elevating the stove above a ground surface, which can make the cooking experience easier and more enjoyable. However, these elevated stoves often need to be placed on flat ground in order to maintain the legs in a stable, level position. Otherwise, the stove may wobble, tip, or fall over. Since many camp sites and other outdoor locations lack flat ground, many people avoid using stoves with legs.

SUMMARY

According to some embodiments, there is a stove comprising a stove body defining an interior cooking chamber, and a plurality of removable leg assemblies for supporting the stove body. Each leg assembly includes a removable leg, and a coupling member for coupling the removable leg to the stove body. The coupling member is configured to provide an adjustable length.

The coupling member may be extendable and retractable relative to the stove body.

The coupling member may have a threaded portion for providing the adjustable length. The threaded portion may have male threads. Each leg assembly may include a sleeve attached to the stove body. The sleeve may have threads for engaging the threaded portion of the coupling member.

The threaded portion may be tapered. For example, the threaded portion may be tapered at an angle of less than about 2-degrees.

The coupling member may have a gripping portion for gripping the coupling member while adjusting the length of the leg assembly.

The coupling member may be formed as a tubular member having an internal reinforcement.

The plurality of removable leg assemblies may include at least four removable leg assemblies.

The stove body may have a generally rectangular shape, and the at least four removable leg assemblies may be located at four corners of the stove body.

The stove body may include a stove base having an internal storage area for receiving the removable legs when decoupled from the coupling members.

The stove may further comprise a burner assembly. The burner assembly may include a gas burner surrounded by a ventilated chimney.

The stove body may be at least partially made of cast aluminum.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
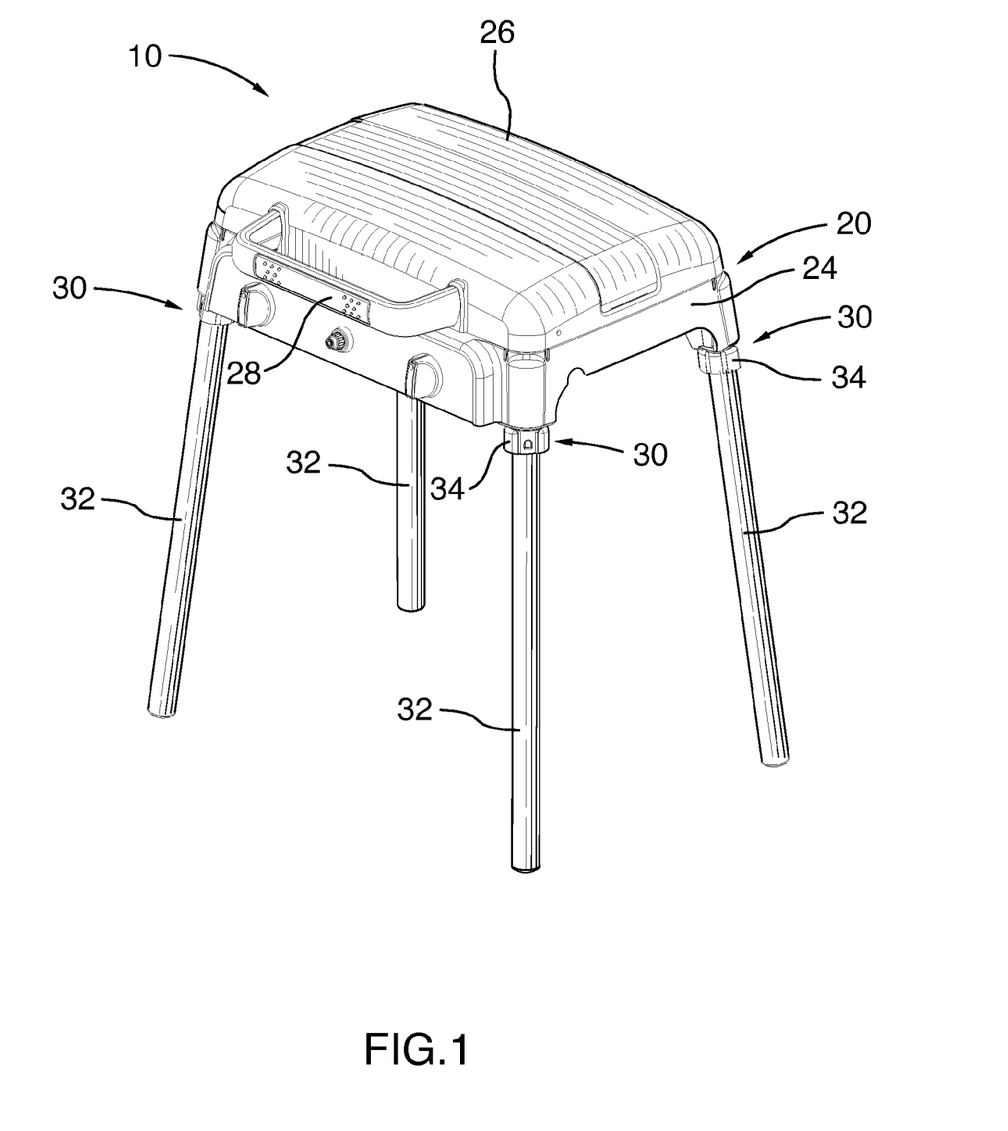
FIG. 1 is a perspective view of a stove according to one embodiment.
Figure 2:
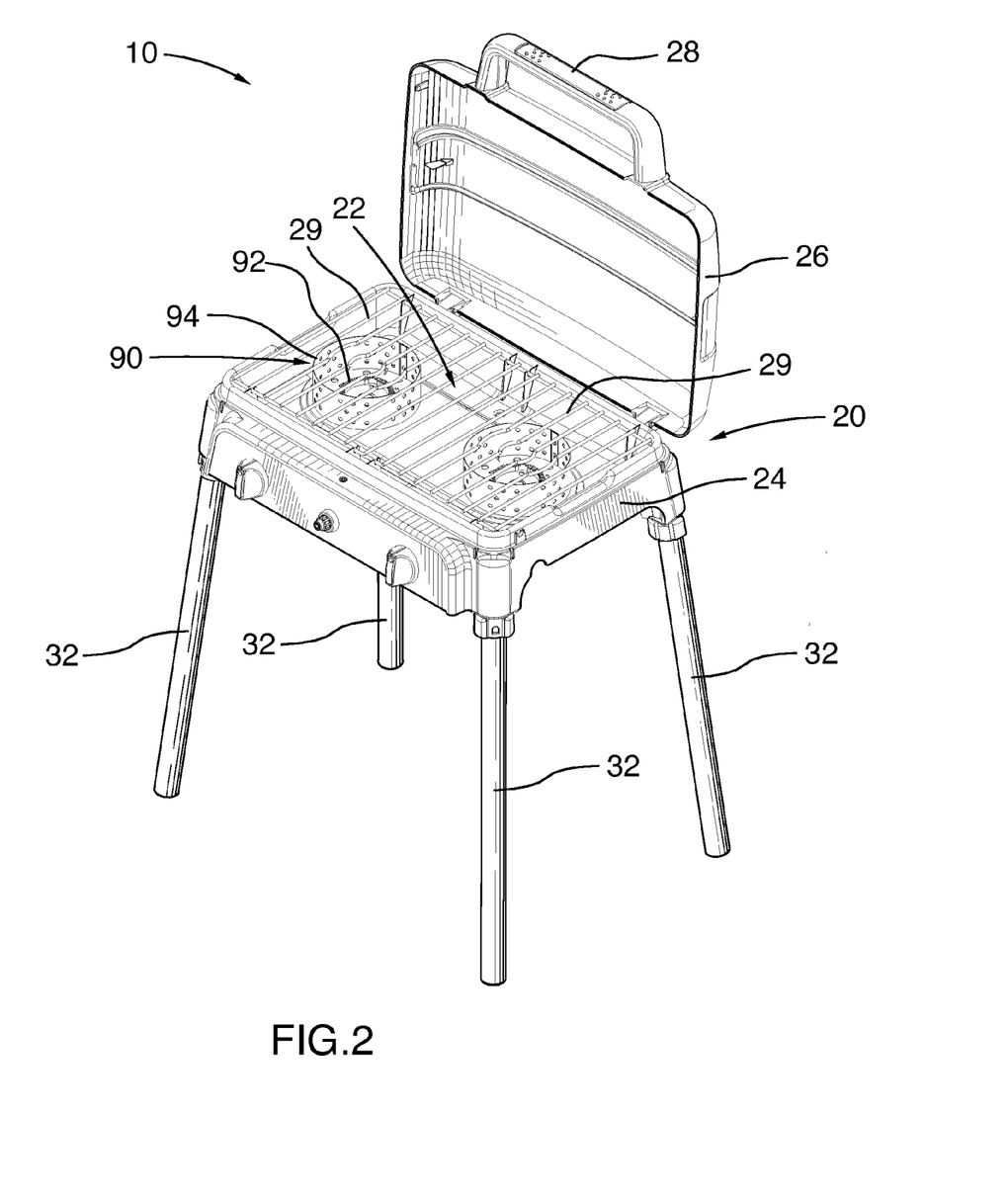
FIG. 2 is a perspective view of the stove of FIG. 1 with a lid opened.

Referring to FIGS. 1 and 2, there is a portable stove 10. The stove 10 may be used while camping or otherwise spending time outdoors. The stove 10 includes a stove body 20 defining an interior cooking chamber 22 for cooking food. As shown, the stove body 20 may include a stove base 24 and a lid 26. The lid 26 may be adapted to removably cover the cooking chamber 22. For example, the lid 26 may be hingedly coupled to the stove base 24 and may have a handle 28 for pivoting the lid 26 to between open and closed positions. The stove 10 may also include one or more grates 29 for supporting food or cookware within the cooking chamber 22. As shown, the stove body 20 may have a generally rectangular shape. In other examples, the stove body 20 may have other shapes such as circular or oval.

The stove 10 also includes a plurality of removable leg assemblies 30 for supporting the stove body 20. As shown, there may be four leg assemblies 30, which may be located at four corners of the stove body 20. The leg assemblies 30 may help elevate the stove 10 above a support surface such as a ground surface at a camp site.

Figure 3:
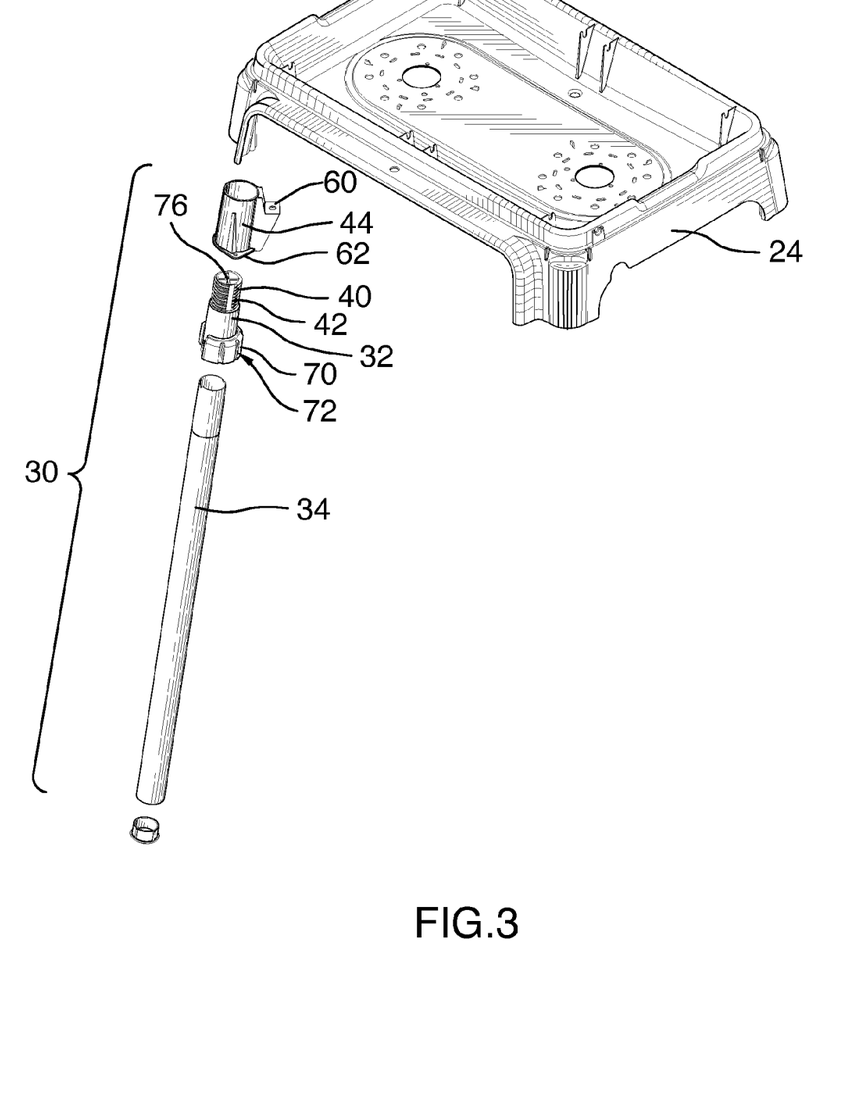
FIG. 3 is an exploded perspective view of a portion of the stove of FIG. 1 showing a stove base and a removable leg assembly.
Figure 4:
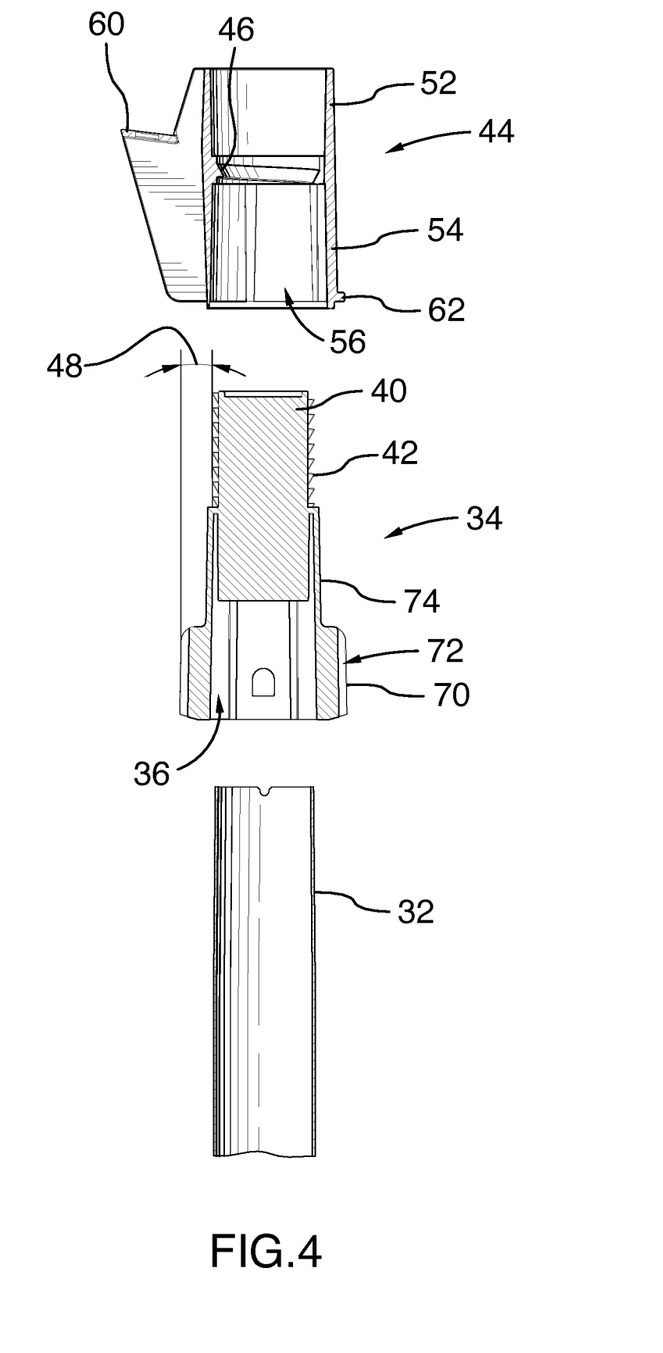
FIG. 4 is an exploded cross-sectional side elevation view of the removable leg assembly of FIG. 3.

With references to FIGS. 3 and 4, each leg assembly 30 includes a removable leg 32 and a coupling member 34. The removable leg 32 is generally an elongate member, which may have a cylindrical or tubular shape. The coupling member 34 couples the removable leg 32 to the stove body 20.

In some embodiments, the removable leg 32 and coupling member 34 may be assembled in an axial fashion. For example, the coupling member 34 may have one end directly or indirectly coupled to the stove body 20, and an opposite end with an opening sized and shaped for receiving the removable leg 32. Specifically, as shown in FIG. 4, the coupling member 34 may have an annular slot 36 for receiving the tube-shaped removable leg 32. The annular slot 36 may be sized and shaped to provide a friction fit with the removable leg 32, which may inhibit unintentional removal of the leg 32.

The coupling member 34 is also configured to provide an adjustable length. The adjustable length can be used to help level the stove body 20. This can be particularly useful when the support surface is uneven, which is often the case at camp grounds.

In some examples, the coupling member 34 may be extendable and retractable relative to the stove body 20. This can provide the leg assembly 30 with the adjustable length. For example, as shown in FIGS. 3 and 4, the coupling member 34 may have a threaded portion 40 for being adjustably screwed in or out relative to the stove body 20. More specifically, the threaded portion 40 may have male threads 42, and each leg assembly 30 may further include a sleeve 44 attached to the stove base 24 for receiving the threaded portion 40. As shown, the sleeve 44 may have female threads 46 corresponding to the male threads 42. In use, the length of the leg assembly 30 can be increased or decreased by screwing the threaded portion 40 into or out of the sleeve 44.

In some embodiments, the threaded portion 40 may be tapered. For example, the threaded portion may be tapered at an angle 48 of less than about 2-degrees, or more particularly, about 1-degree.

Referring still to FIGS. 3 and 4, the sleeve 44 is generally sized and shaped to receive the threaded portion 40 of the coupling member 34 therethrough. For example, the sleeve 44 may have a tubular shape with the female threads 46 located on an interior cylindrical surface of the sleeve 44. Furthermore, the female threads 46 may be positioned so that there is a first tubular portion 52 located on one side of the female threads 46, and a second tubular portion 54 on the other side of the female threads 46. The first tubular portion 52 may be positioned against the stove base 24, and the second tubular portion 54 may have an opening 56 sized and shaped to receive the threaded portion 40 of the coupling member 34.

In some embodiments, the first and second tubular portions 52, 54 may have lengths selected to be similar to the length of the threaded portion 40. This allows the threaded portion 40 to be completely received within the first tubular portion 52 of the sleeve 44 when fully screwed therein (i.e. without impinging the bottom of the stove base 24. Furthermore, when the threaded portion 40 is fully unscrewed from the sleeve 44, the second tubular portion 54 may cover and conceal the threaded portion 40, which may protect the threads from being damaged.

As shown in the illustrated embodiment, the sleeve 44 may include one or more features for attaching the sleeve 44 to the stove base 24. For example, the sleeve 44 may include a mounting ledge 60 and a mounting flange 62, each being attachable to the stove base 24, for example, using fasteners such as screws, bolts, and the like. The sleeve 44 could also be attached to the stove base 24 using other means such as adhesive, clips, welds, and the like.

While the illustrated embodiment includes sleeves 44 attached to the stove base 24, in other examples, the sleeves 44 may be omitted and the female threads 46 may be located on other portions of the stove 10. For example, the underside of the stove base 24 may be formed with openings having female threads for receiving the male threads of the threaded portion 40.

Furthermore, in other examples, the threaded connection may be reversed such that the stove body 20 or sleeves 44 have male threads and the threaded portions 40 of the coupling members 34 have female threads.

Referring still to FIGS. 3 and 4, the coupling member 34 may include a gripping portion 70. This may assist a user in gripping the coupling member 34 while adjusting the length of the leg assembly 30. The gripping portion 70 may have an enlarged diameter compared to the rest of the coupling member 34. Furthermore, the gripping portion 70 may have a textured surface such as one or more longitudinal grooves 72 on the outside surface of the coupling member 34. The gripping portion 70 could also have other configurations, such as a knurled surface.

The gripping portion 70 may be located on the coupling member 34 at the opposite end as the threaded portion 40. Furthermore, the gripping portion 70 may be spaced apart from the threaded portion 40 by a middle portion 74. The middle portion 74 may have a length selected to be of similar length as the threaded portion 40. This may keep the gripping portion 70 accessible even when the threaded portion 40 is fully screwed into the sleeve 44.

In some embodiments, the coupling member 34 may be formed as a tubular member having an internal reinforcement 76 such as a cruciform shaped cross-rib as shown in FIG. 3. The tubular configuration may reduce manufacturing costs and weight, while the internal reinforcement 76 may provide strength and rigidity.

Figure 5:
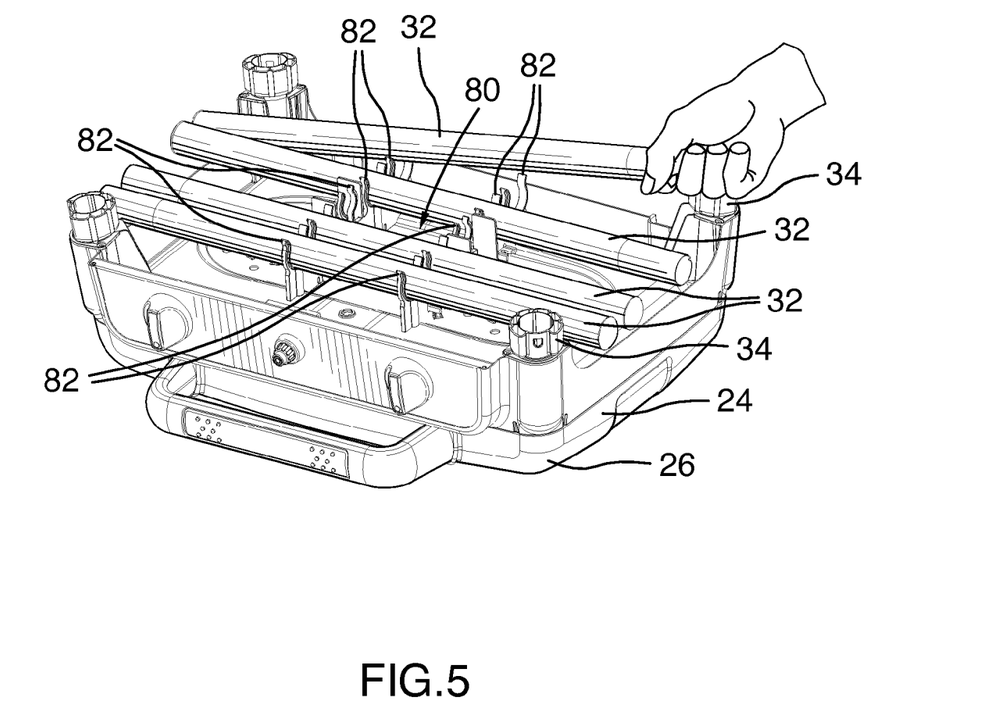
FIG. 5 is a bottom perspective view of the stove of FIG. 1.

Referring now to FIG. 5, the stove base 24 may have an internal storage area, which may be sized and shaped to receive one or more components of the stove 10 such as the removable legs 32 (when decoupled from the coupling members 34). More particularly, as shown, the stove base 24 may have a recessed bottom 80 that acts as the internal storage area. Furthermore, the stove base 24 may include one or more clips 82 located within the storage area for securing the removable legs 32 therein. The clips 82 may have a generally C-shaped profile. Placing the removable legs 32 in the storage area may help provide compact transportation of the stove 10. Other components such as a fuel canister could also be placed in the storage area.

Referring again to FIG. 2, the stove 10 generally includes one or more burner assemblies 90. Each burner assembly 90 may include a gas burner 92 and a ventilated chimney 94 surrounding the gas burner 92. The gas burner 92 is configured to emit a flame while the ventilated chimney 94 provides ventilation and protects the flame from wind. Specifically, the ventilated chimney 94 is defined by a circumferential wall around the gas burner, and the circumferential wall has a plurality of openings for providing oxygen to the gas burner 92. The ventilated chimney 94 may protect the gas burner 92 from wind, while the openings in the ventilated chimney 94 allow oxygen to flow to the gas burner 92.

In some embodiments, the stove body 20 may be at least partially made from one or more refractory materials. For example, the stove base 24 and lid 26 may be made from cast aluminum or other heat resistant metals. This may enhance heat retention within the cooking chamber 22, while also providing durability.

Figure 6:
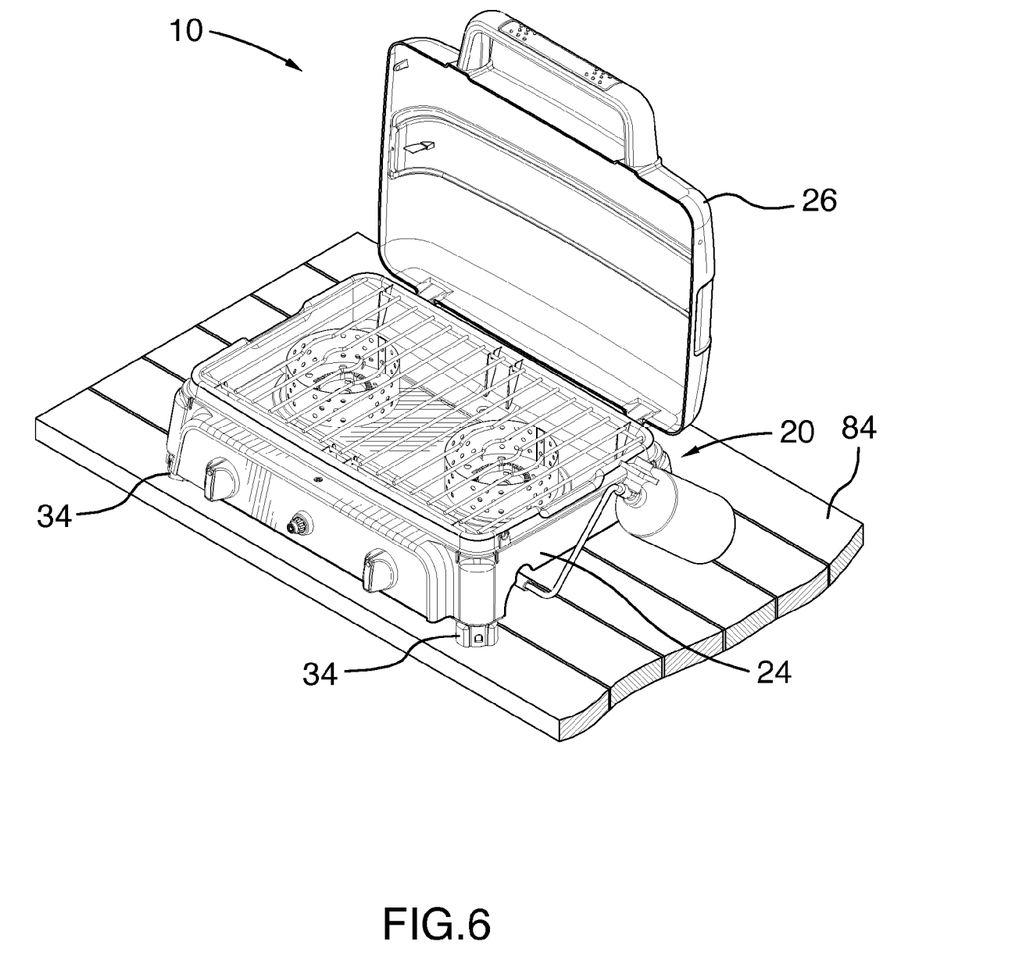
FIG. 6 is a perspective view of the stove of FIG. 1 placed on a table with the legs removed.

While the embodiments described above refer to coupling members 34 that provide the leg assembly 30 with an adjustable length, the coupling members 34 can also be used to level the stove body 20 on other support surfaces even when the legs 32 are removed. For example, as shown in FIG. 6, the coupling members 34 can be used to level the stove body 20 on a picnic table 84 or another support surface.

Furthermore, while the embodiments described above use a threaded connection to provide the adjustable length, in other embodiments there may be another type of length adjustment mechanism such as a ratcheting device. The ratcheting device may include a linear set of teeth on the coupling member 34, and a pawl located on the sleeve 44 for engaging the teeth, or vice versa.

While the above description provides examples of one or more apparatus, methods, or systems, it will be appreciated that other apparatus, methods, or systems may be within the scope of the present description as interpreted by one of skill in the art.

The invention claimed is:

1. A stove comprising:
   a) a stove body defining an interior cooking chamber;
   b) a plurality of removable leg assemblies for supporting the stove body, each leg assembly including:
      i) a removable leg; and
      ii) a coupling member that is separable from the removable leg, the coupling member adapted to couple the removable leg to the stove body, and the coupling member adapted to provide an adjustable length to level the stove body when the removable leg is separated from the coupling member.

2. The stove of claim 1, wherein the coupling member is extendable and retractable relative to the stove body.

3. The stove of claim 2, wherein the coupling member has a threaded portion for providing the adjustable length.

4. The stove of claim 3, wherein the threaded portion has male threads.

5. The stove of claim 3, wherein each leg assembly includes a sleeve attached to the stove body, the sleeve having threads for engaging the threaded portion of the coupling member.

6. The stove of claim 3, wherein the threaded portion is tapered.

7. The stove of claim 6, wherein the threaded portion is tapered at an angle of less than about 2-degrees.

8. The stove of claim 1, wherein the coupling member has a gripping portion for gripping the coupling member while adjusting the length of the leg assembly.

9. The stove of claim 1, wherein the coupling member is formed as a tubular member having an internal reinforcement.

10. The stove of claim 1, wherein the plurality of removable leg assemblies includes at least four removable leg assemblies.

11. The stove of claim 10, wherein the stove body has a generally rectangular shape, and wherein the at least four removable leg assemblies are located at four corners of the stove body.

12. The stove of claim 1, wherein the stove body includes a stove base having an internal storage area for receiving the removable legs when decoupled from the coupling members.

13. The stove of claim 1, further comprising a burner assembly.

14. The stove of claim 13, wherein the burner assembly includes a gas burner surrounded by a ventilated chimney.

15. The stove of claim 1, wherein the stove body is at least partially made of cast aluminum.

16. The stove of claim 1, wherein each coupling member comprises an annual slot sized and shaped to receive the removable leg therein.

17. The stove of claim 16, wherein the annual slot provides a friction fit with the removable leg so as to inhibit unintentional removal of the leg.

* * * * *